(No Model.)
J. R. GATHRIGHT.
FLUID CAR.
No. 320,775. Patented June 23, 1885.
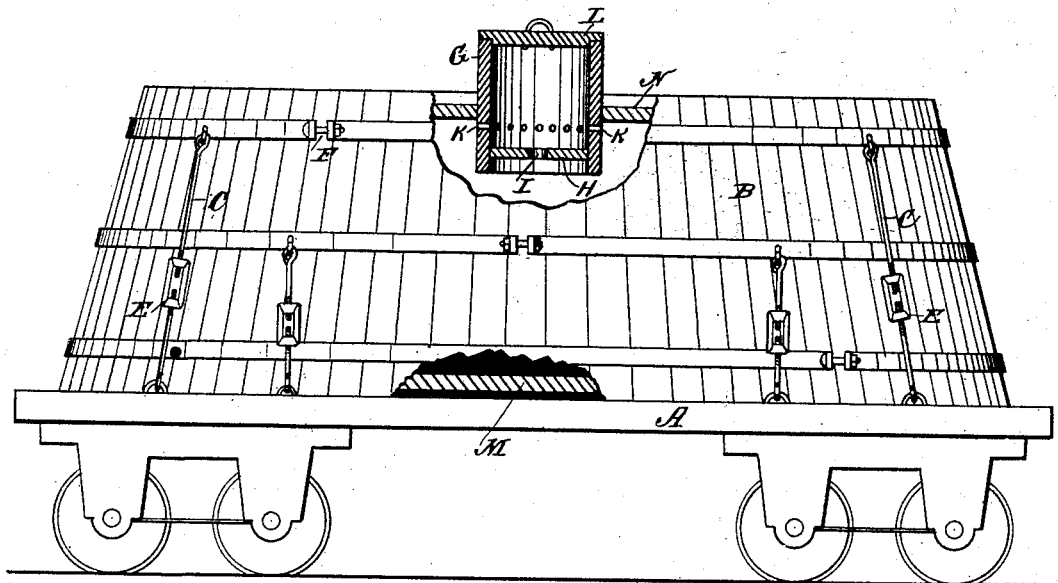
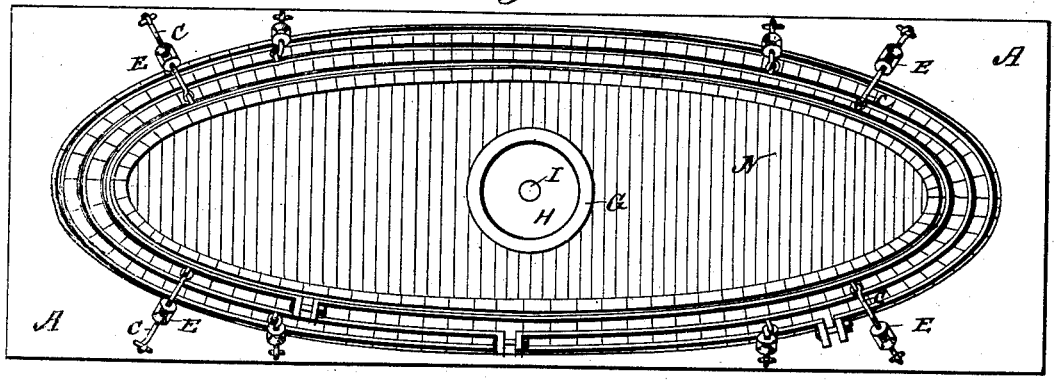
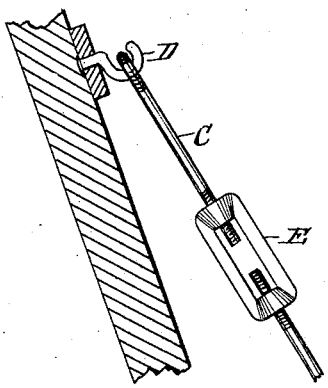
Witnesses:
W. W. Hollingsworth
H. P. Brown
Inventor:
John R. Gathright
By W. X. Stevens.
Attorney.

UNITED STATES PATENT OFFICE.

JOHN R. GATHRIGHT, OF JEFFERSONVILLE, INDIANA.

FLUID-CAR.

SPECIFICATION forming part of Letters Patent No. 320,775, dated June 23, 1885.

Application filed March 21, 1885. (No model.)

*To all whom it may concern:*

Be it known that I, JOHN R. GATHRIGHT, a citizen of the United States, residing at Jeffersonville, in the county of Clark and State of Indiana, have invented certain new and useful Improvements in Fluid-Cars; and I do hereby declare the following to be a full, clear, and exact description of the invention, such as will enable others skilled in the art to which it appertains to make and use the same.

Heretofore it has been common to place cylindrical iron tanks horizontally upon cars to carry fluids, such as petroleum-oil; but iron is expensive, and not a suitable material for carrying many fluids, for they are contaminated thereby. Furthermore, a cylindrical tank does not distribute the load evenly over the car, nor does it let the load rest flat down upon the car-body; but it requires heavy timbers to be carried to support the cylinder. It has also been common to mount two wooden tanks on a platform car, one at each end thereof, for the purpose of distributing the load upon the car; but this method locates the weight in two spots, and does not utilize the central area of the car, on which account the tank must be proportionately high in order to carry a fair load, and the load is thus raised so high as to seriously increase the labor of hauling up grades and around curves.

The object of this invention is to produce a tank of wood, suitable to carry on a car any fluid in bulk—such as whisky, vinegar, petroleum-oil, &c.—and in such form that it may equally distribute the weight upon nearly the whole surface of the car, in order that the car may be made as light as possible, and in order that the maximum load may be as low down upon the car as possible.

It also consists in means whereby the staves forming the tank may be secured together, and whereby the tank may at the same time be secured upon the car.

It further consists in means whereby the tank may be relieved from pressure caused by heat generated by friction of the fluid upon the tank by the motion of travel, or by the sun, and means whereby the tank may be kept so near full as to effectually prevent slopping.

To this end my invention consists in the construction and combination of parts forming a fluid-car, hereinafter described and claimed, reference being had to the accompanying drawings, in which—

Figure 1 is a side elevation, part in section, of a car, showing my invention. Fig. 2 is a plan view of the same with the cover removed, and Fig. 3 is a detail view of the fastening device on a larger scale.

A represents a common platform-car.

B is a tank or tub, made of nearly vertical staves tapering toward the top and formed in an oval or elliptical shape, nearly conforming to the parallelogram of the car-top. The tank is, practically, a hollow truncated cone with an elliptical base. This form I find to be a necessity in order to economize space on the car, and to make the hoops hold the staves together. It is well known that a tub must be convex or bulging outward at all parts of its circumference, in order that it may be held together by hoops. I have therefore selected the ellipse as the best form for a tub which can fill the requirements, and I so proportion the tub to the car that its transverse axis is nearly equal to the length of the car, and its conjugate axis is nearly equal to the width thereof. By this means the greatest area of the car is utilized, which can be done by a tub on every stave of which a hoop will bear to hold the tub together. I also make the tub smallest at the top, and I secure it upon the car by means of stay-bolts C, secured at one end to the car and at the other end to a hoop, D. By this means the shaking of the car, which, commonly, has a tendency to loosen the staves of tubs, tends to hold the tub together tighter, because the hoop is constantly pulled downward upon a larger portion of the tub.

I provide each of the stay-bolts with a swivel screw-nut, E, by which it may be at any time shortened to keep its hold upon the hoop firm. I have no doubt that tubs have before been held in place by stay-bolts; but it is common to fasten such bolts firmly to plates secured rigidly to the tub, or, when the bolts have been fastened to hoops of the tub, such hoops are rigidly fixed to the tub on purpose to prevent their being drawn down by the bolts.

I provide a screw-tightener, F, for the hoops, so that when the car returns from a journey, if the hoop is found to be drawn down too low, the stay-bolts may be loosened, the hoop raised to place and tightened, and the stay-bolts be adjusted.

G represents a stand-pipe, through which the tank may be filled, and up into which the fluid may rise when heat swells it. It also serves as a reservoir to carry a small surplus of fluid to keep the tank full when the fluid becomes settled from leakage or constant jarring. This stand-pipe is peculiar in four respects: First, it extends down some distance into the top of the tank, to act as a partition or temporary dam to check the flow of waves along the top of the fluid when the car is suddenly started or stopped; second, it is provided with a bottom, H, having a small aperture, I, through which the fluid may slowly rise or fall, but too small to permit the bulk of fluid to rise through rapidly enough to slop over; third, the bottom H is below the top of the tank, but does not extend to the lower end of the stand-pipe, in order that the edges of the said pipe below the said bottom may further act to check undulations in the fluid, and prevent direct rush at the aperture I, and in order to facilitate the operation of filling the tank; fourth, the stand-pipe is provided with vent-holes K through its sides into the tank just beneath the top N thereof, in order that the air may escape at a level above the bottom H when the latter is covered and the aperture I is closed by the fluid in rapidly filling the tank. Vent-holes in the top of the tank would be disastrous in many ways, and yet vent-holes must be had above the lower edge of the stand-pipe, or there would be an air-chamber above that level that could not be filled.

L is a cover to the stand-pipe, which may be loosely fitted thereon, and be locked, to prevent abduction of the fluids by means of straw-suckers, &c., and yet permit the escape of heated air or gas that may be generated in transportation.

M is the bottom of the tank, secured within the staves.

What I claim as my invention, and desire to secure by Letters Patent, is—

1. The combination of a railway platform-car, a tank, nearly as wide and long as the car, mounted thereon, the said tank composed of staves standing on end, tapered upward, and widest on their outer faces, one or more hoops surrounding the tank and bearing on every stave thereof, and bolts connecting the hoops with the car, substantially as shown and described, whereby a tank occupying the length and breadth of a car is held thereon and all the staves are held together as and for the purpose specified.

2. The combination of a platform-car, a tank thereon in the form of a truncated cone, hoops on the tank free to slide vertically, and screw-bolts connecting the hoops with the car, substantially as shown and described.

3. The combination of a car mounted on wheels, a tank, substantially as described, secured thereon, the top of the tank being practically horizontal and extending nearly the length and breadth of the car, a stand-pipe passing through the top of the tank down into the body thereof, and fitted closely and rigidly into the said top, a loose removable cover and a fixed perforated bottom for the stand-pipe, said bottom located in the stand-pipe below the general level of the top of the tank and above the lower edge of the stand-pipe, and vent-holes through the sides of the stand-pipe close below the top of the tank, substantially as shown and described.

In testimony whereof I affix my signature in presence of two witnesses.

JOHN R. GATHRIGHT.

Witnesses:
JAMES KEIGWIN,
EPHRAIM KEIGWIN.